(12) United States Patent
Sigal et al.

(10) Patent No.: US 9,514,363 B2
(45) Date of Patent: Dec. 6, 2016

(54) EYE GAZE DRIVEN SPATIO-TEMPORAL ACTION LOCALIZATION

(71) Applicant: Disney Enterprises, Inc., Burbank, CA (US)

(72) Inventors: Leonid Sigal, Pittsburgh, PA (US); Nataliya Shapovalova, Vancouver (CA); Michail Raptis, Washington, DC (US)

(73) Assignee: Disney Enterprises, Inc., Burbank, CA (US)

( * ) Notice: Subject to any disclaimer, the term of this patent is extended or adjusted under 35 U.S.C. 154(b) by 150 days.

(21) Appl. No.: 14/247,845

(22) Filed: Apr. 8, 2014

(65) Prior Publication Data

US 2015/0286853 A1 Oct. 8, 2015

(51) Int. Cl.
*G06K 9/00* (2006.01)
*G06K 9/62* (2006.01)
*G06K 9/32* (2006.01)

(52) U.S. Cl.
CPC ......... *G06K 9/0061* (2013.01); *G06K 9/00335* (2013.01); *G06K 9/3233* (2013.01); *G06K 9/6263* (2013.01); *G06K 9/6267* (2013.01)

(58) Field of Classification Search
None
See application file for complete search history.

(56) References Cited

U.S. PATENT DOCUMENTS

2014/0006318 A1* 1/2014 Xing .................. G06F 15/16
706/12

OTHER PUBLICATIONS

M. Blaschko and C. Lampert. Learning to localize objects with structured output regression. ECCV, 2008.
C. Chen and K. Grauman. Efficient activity detection with max-subgraph search. In CVPR, 2012.
K. G. Derpanis, M. Sizintsev, K. Cannons, and R. P. Wildes. Efficient action spotting based on a spacetime; oriented structure representation. In CVPR, 2010.
D. V. Essen, B. Olshausen, C. Anderson, and J. Gallant. Pattern recognition, attention, and information; bottlenecks in the primate visual system. SPIE Conference on Visual Information Processing: From; Neurons to Chips, 1991.

(Continued)

*Primary Examiner* — Stephen R Koziol
*Assistant Examiner* — Amandeep Saini
(74) *Attorney, Agent, or Firm* — Patterson + Sheridan, LLP

(57) ABSTRACT

The disclosure provides an approach for detecting and localizing action in video. In one embodiment, an action detection application receives training video sequences and associated eye gaze fixation data collected from a sample of human viewers. Using the training video sequences and eye gaze data, the action detection application learns a model which includes a latent regions potential term that measures the compatibility of latent spatio-temporal regions with the model, as well as a context potential term that accounts for contextual information that is not directly produced by the appearance and motion of the actor. The action detection application may train this model in, e.g., the latent structural SVM framework by minimizing a cost function which encodes the cost of an incorrect action label prediction and a mislocalization of the eye gaze. During training and thereafter, inferences using the model may be made using an efficient dynamic programming algorithm.

23 Claims, 4 Drawing Sheets

(56) References Cited

OTHER PUBLICATIONS

A. Fathi, Y. Li, and J. M. Rehg. Learning to recognize daily actions using gaze. In ECCV, 2012.
P. Felzenszwalb, R. Girshick, D. McAllester, and D. Ramanan. Object detection with discriminatively; trained part based models. IEEE PAMI, 2010.
Y. Ke, R. Sukthankar, and M. Hebert. Event detection in crowded videos. In ICCV, 2007.
A. Kovashka and K. Grauman. Learning a Hierarchy of Discriminative Space-Time Neighborhood Features; for Human Action Recognition. In CVPR, 2010.
I. Laptev. On space-time interest points. IJCV, 64, 2005.
M. Raptis and L. Sigal. Poselet key-framing: A model for human activity recognition. In CVPR, 2013.
M. Ryoo and J. Aggarwal. Spatio-temporal relationship match: Video structure comparison for recognition; of complex human activities. In ICCV, 2009.
P. Turaga, R. Chellappa, V. Subrahmanian, and O. Udrea. Machine recognition of human activities: A; survey. IEEE Transactions on Circuits and Systems for Video Technology, 18(11):1473-1488, 2008.
E. Vig, M. Dorr, and D. Cox. Space-variant descriptor sampling for action recognition based on saliency; and eye movements. In ECCV, 2012.
H. Wang, M. M. Ullah, A. Kraser, I. Laptev, and C. Schmid. Evaluation of local spatio-temporal features for action recognition. In BMVC, 2009.
Y. Wang and G. Mori. Hidden part models for human action recognition: Probabilistic vs. max-margin.; IEEE PAMI, 2010.
D. Weinland, R. Ronfard, and E. Boyer. A survey of vision-based methods for action representation; segmentation and recognition. Computer Vision and Image Understanding, 115(2):224-241, 2011.
J. Yang and M.-H. Yang. Top-down visual saliency via joint crf and dictionary learning. In CVPR, 2012.
C.-N. J. Yu and T. Joachims. Learning structural svms with latent variables. In ICML, 2009.
J. Yuan, Z. Liu, and Y. Wu. Discriminative subvolume search for efficient action detection. In CVPR,; 2009.
J. Yuan, Z. Liu, and Y.Wu. Discriminative video pattern search for efficient action detection. IEEE PAMI,; 33(9), 2011.
"T. Lan, Y. Wang, and G. Mori. Discriminative figure-centric models for joint action localization and recognition. In ICCV, 2011."
"S. Mathe and C. Sminchisescu. Dynamic eye movement datasets and learnt saliency models for visualaction recognition. In ECCV, 2012."
"M. Raptis, I. Kokkinos, and S. Soatto. Discovering discriminative action parts from mid-level video representations. In CVPR, 2012."
"M. Rodriguez, J. Ahmed, and M. Shah. Action MACH: a spatio-temporal maximum average correlation height filter for action recognition. In CVPR, 2008."
"N. Shapovalova, A. Vandat, K. Cannons, T. Lan, and G. Mori. Similarity constrained latent support vectormachine: An application to weakly supervised action classification. In ECCV, 2012."
D. Tran and J. Yuan. Optimal spatio-temporal path discovery for video event detection. In CVPR, 2011.
"D. Tran and J. Yuan. Max-margin structured output regression for spatio-temporal action localization. InNIPS, 2012."

* cited by examiner

EYE GAZE DRIVEN SPATIO-TEMPORAL ACTION LOCALIZATION

BACKGROUND

Field

Embodiments presented herein provide techniques for detecting action in recorded video and, more specifically, a weakly-supervised structured learning technique for recognizing and localizing actions in video.

Description of the Related Art

The problem of jointly classifying and localizing human actions in video has typically been treated in the same manner as object recognition and localization in images. As used herein, "localizing" may include finding an enclosing spatio-temporal volume or spatio-temporal extent. Object recognition and localization in images cannot be easily extended to a temporal domain, as in the case of classifying actions in video. Some challenges may include: (1) dealing with motion of the actor within the frame, resulting from the camera or the actor's own motion in the world; (2) complexity of the resulting spatio-temporal search, which requires a search over the space of temporal paths; (3) needing to model coarse temporal progression of the action and action context; and (4) learning in absence of direct annotations for actor(s) position within the frame.

Traditional techniques for detecting action in videos typically use holistic bag-of-words (BoW) models, or models that search for sub-volumes that are axis-aligned or purely discriminative. Holistic BoW models techniques generally take different features and cluster them, and then attempt to find the frequency of "words" within a given video. Such models do not allow for spatial (and often temporal) localization of actions. Models that search for sub-volumes do allow for localization but largely assume a static subject and camera. Further, methods that allow localization typically require bounding-box annotations at training time.

SUMMARY

One aspect of the invention provides a computer implemented method for detecting action in a video. The method generally includes receiving training video sequences and eye gaze data associated therewith. The method also includes training an action detection model using the training video sequences and the eye gaze data, where the training includes minimizing a loss function which penalizes misclassification of action and mislocalization of eye gaze regions. In addition, the method includes receiving an input video, and detecting occurrences of actions in the input video using the trained action detection model.

Other aspects include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of aspects of the invention, briefly summarized above, may be had by reference to the appended drawings.

It is to be noted, however, that the appended drawings illustrate only typical aspects of this invention and are therefore not to be considered limiting of its scope, for the invention may admit to other equally effective aspects.

DETAILED DESCRIPTION

Figure 1:
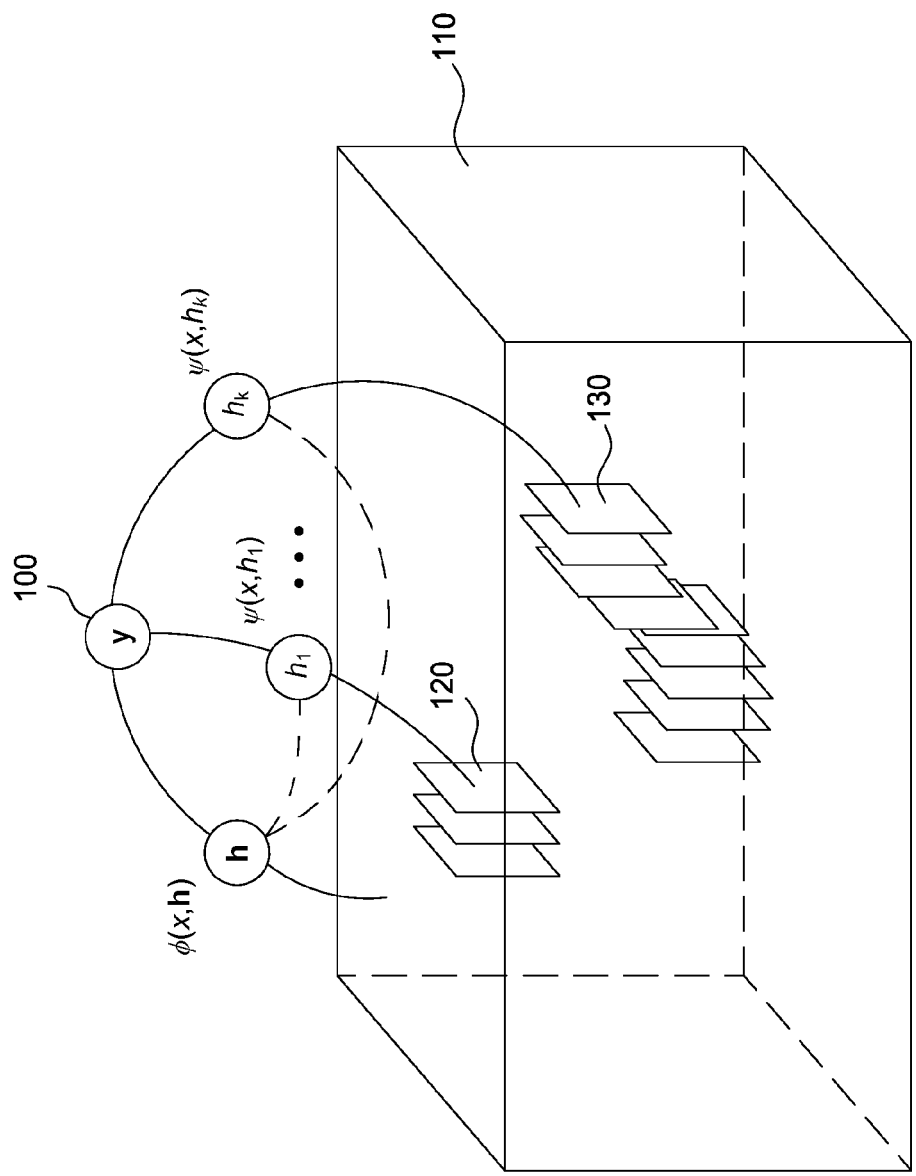
FIG. 1 illustrates a model which may be trained and used to recognize and localize actions in video, according to an embodiment.

Embodiments disclosed herein provide techniques for detecting and localizing action in video. In one embodiment, an action detection application receives training video sequences with annotations of action and associated eye gaze fixation data collected from a sample of viewers. For example, the action detection application may receive training videos with annotations indicating that the videos depict a "person sitting," a "person driving a car," etc., as well as eye gaze data recorded from human observers who watched the videos. Such eye gaze data is received in lieu of spatial annotations (e.g., bounding boxes) indicating where action occurs in the training videos.

Using the annotated training videos and eye gaze data, the action detection application learns a model which can localize temporally and spatially discriminative regions of video and encode the context in which these regions occur. Such learning may include iteratively making predictions using the model and adjusting the parameters of the model to minimize a loss function which penalizes misclassification of action and mislocalization of eye gaze regions. That is, the loss function penalizes incorrect predictions of action, as well as bounding boxes which do not overlap much with eye gaze data. Here, eye gaze is used for weak supervision rather than the ground truth of where action occurs, as eye gaze may not correspond to action in video (e.g., the viewer may become distracted by background scenery). The learned model may be capable of outputting the presence of particular actions (e.g., "person sitting," "person driving a car," etc.) in an input video sequence while simultaneously extracting the most discriminative and perceptually salient spatio-temporal regions, where action is predicted to occur. As used herein, "salient" regions refers to prominent or important regions. These regions may be defined as spatio-temporal regions where actions occur and observers will attend to when looking at the actions (or trying to classify the actions). Within each region, optionally, the learned model may also be capable of predicting which specific pixels an observer is likely to focus on while recognizing the action.

In one embodiment, the model whose parameters are trained may include a latent region term which measures the compatibility of latent spatio-temporal regions with the model, as well as a context term which accounts for contextual information that is not directly produced by the appearance and motion of the actor. The action detection application may train this model in, e.g., the latent structural SVM framework by minimizing a cost function which encodes the cost of an incorrect action label prediction and a mislocalization of the eye gaze. During training and thereafter, inferences (i.e., predictions) using the model may be made using an efficient dynamic programming algorithm for searching over a structured space of multiple spatio-temporal paths, discussed in greater detail below. Such a dynamic programming algorithm may assume that an action can be encoded by a set of latent/unobserved volumes in space-time, designating a smoothly varying "fovial" fixation path, and search over all possible such volumes to find the ones most indicative of action.

FIG. 1 illustrates a model 100 which may be trained and used to recognize and localize actions in video, according to an embodiment. Given a set of training video sequences $\{x_1, \ldots, x_n\} \subset X$ and their associated labels $\{y_1, \ldots, y_n\}$ which indicate the actions present in the video sequences, with $y_i \in \{-1,1\}$, the objective of learning is to determine a mapping f: $X \rightarrow \{-1,1\}$. The trained model 100 is one such mapping.

As shown, the model 100 may include auxiliary latent variables $\{h_1, \ldots, h_n\}$, where $h_i = \{h_{i1}, \ldots, h_{ik}\}$ and $h_{ip} \in \emptyset \cup \{(l^j, t^j, r^j, b^j)_{j=T_s}^{T_e}\}$ denote the left, top, right, and bottom coordinates of spatio-temporal paths of bounding boxes that are defined from frame $T_s$ to $T_e$. The latent variables h specify the spatio-temporal regions selected by the model 100. For example, each of the latent variables h may be a long vector specifying, for each frame, coordinates of a bounding box, such as bounding box 120 in one of the frames of the video 110, where action is predicted to occur. The model 100 searches over possible sets of such latent variables and picks a set of latent variables that are "best," according to the model that has been learned. This search is combinatorially difficult, but some embodiments employ dynamic programming algorithms, discussed in greater detail below, to perform the search efficiently. The model 100 also outputs the action label y which represents the action that is predicted to occur in the latent regions. Note that the representation of the latent variables, and hence spatio-temporal regions may differ in different embodiments (e.g., center point and single fixed radii may be used to search over "cylindrical" regions; center point with variable radii that is estimated in each frame may be used to search over the space of irregularly shaped regions with circular cross-section).

In one embodiment, the model 100 may then be written as the function $y_x^*(w) = f(x; w)$, where $$(y_x^*(w), h_x^*(w)) = \operatorname{argmax}_{(y,h) \in \{-1,1\} \times H} F(x, y, h; w),$$
$$F(x, y, h; w) = w^T \Psi(x, y, h), \quad (1)$$

and $\Psi(x, y, h) \in \mathbb{R}^d$ is a joint feature map. Video sequences in which the action of interest is absent may be treated as zero vectors in the Hilbert space induced by the feature map $\Psi$.

In another embodiment, the feature map of videos may be decomposed into components: (1) latent regions, and (2) context areas. The scoring function for the model 100 may then be written as:

$$F(x, y=1, h; w) = w^T \Psi(x, y=1, h) = w_0^T \phi(x, h) + \sum_{k=1}^{K} w_k^T \psi(x, h_k) + b, \quad (2)$$

where K is the number of latent regions of the action model 100 and b is a bias term.

Here, $w_k^T \psi(x, h_k)$ is a latent regions potential function that measures the compatibility of latent spatio-temporal region $h_k$ with the action model. In one embodiment, $\psi(x, h_k)$ may return the sum of normalized BoW histograms extracted from the bounding box defined by the latent variable $h_k = (l^j, t^j, r^j, b^j)_{j=T_s}^{T_e}$, at each corresponding frame.

$w_0^T \phi(x, h)$ is a context potential which may be defined as the entire video sequence excluding the latent regions. The context potential attempts to capture any information that is not directly produced by the appearance and motion of an actor. The characteristics of the context are encoded in $\phi(x, h)$ as a sum of normalized BoW histograms at each frame of the video excluding the regions indicated by latent variables h.

Figure 2:
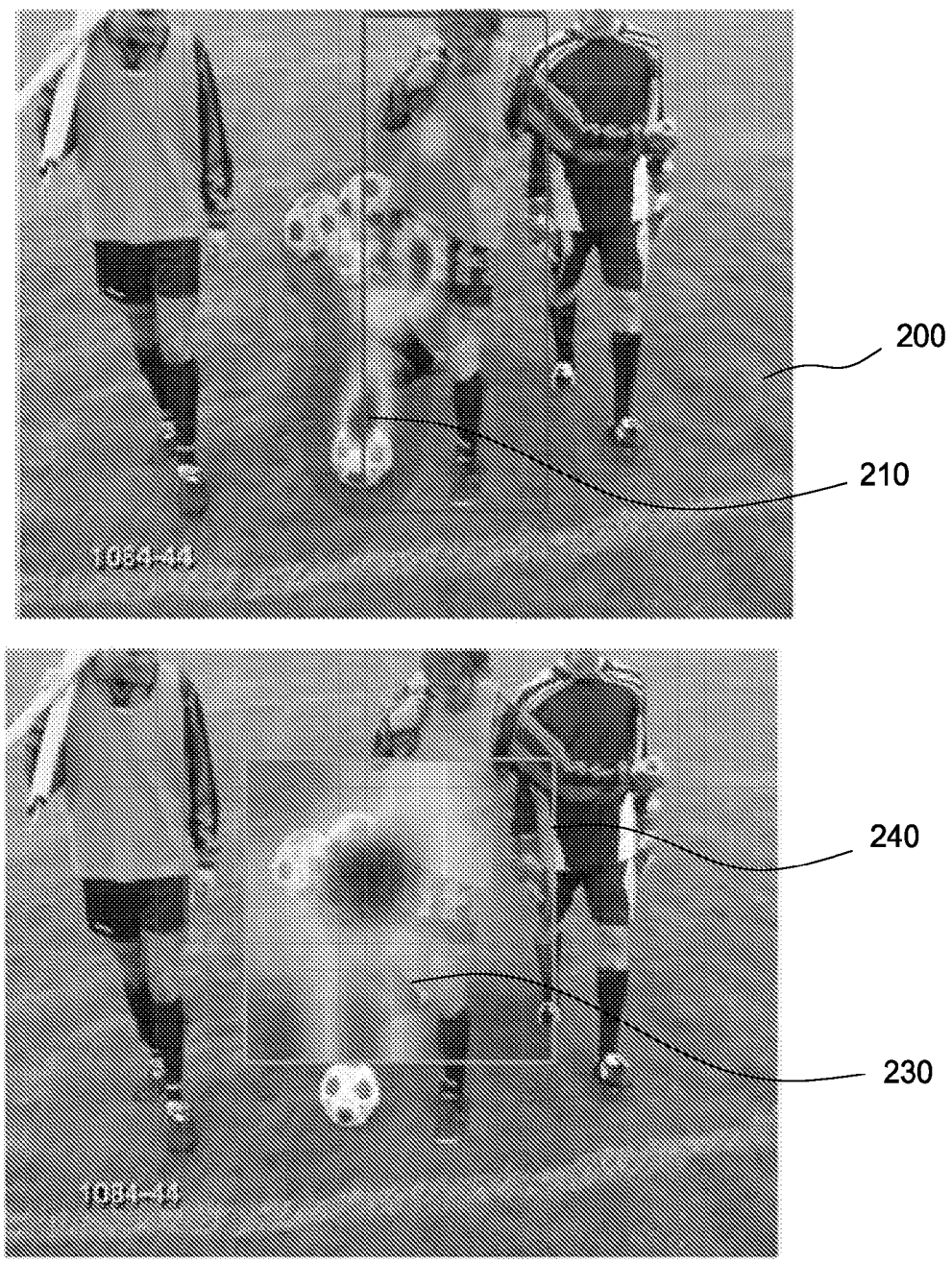
FIG. 2 illustrates eye gaze data used to train the model 100 and eye gaze prediction using the model of FIG. 1, according to an embodiment.

FIG. 2 illustrates eye gaze data used to train the model 100 and eye gaze prediction using the model 100, according to an embodiment. As shown in panel A, eye gaze data 210 is shown as a gaze map for a video frame 200 in a video sequence which depicts the action of kicking a ball. The eye gaze data is experimentally acquired from, e.g., an infra-red (IR) camera that shoots IR light at an eye and solves for eye gaze. In one embodiment, the action detection application may receive, during training, eye gaze data, video frames, and action labels (e.g., "kick") indicating the action depicted in the video frames. In such a case, the action detection application may train parameters of the model 100 using the training video, eye gaze data, and action labels, by minimizing a loss function which encodes the cost of an incorrect action label prediction by the model as well as a mislocalization of eye gaze (i.e., incorrect eye gaze location prediction) by the model. The training may include iteratively making predictions using the model 100, computing the loss function, and adjusting the model parameters to minimize the loss function. During training, the eye gaze data is used as a suggestion rather than the ground truth, as eye gaze may not always reflect where action occurs. For example, the viewer may become distracted by background scenery and shift his or her eye gaze away from the action.

As shown in panel B, the action detection application may also predict eye gaze 240 in a video frame. In one embodiment, the action detection application may learn a linear regression, per action class, that maps an augmented feature representation (e.g., normalized BoW histograms collected in sub-regions) extracted from the bounding box defined by the latent variable, of each latent region where action is predicted by the model 100 to occur, to a coarse description of the corresponding eye gaze distribution received during trained. This trained linear regression may then be applied to a video to predict eye gaze in latent regions such as bounding box 240, which are themselves predicted with the trained model 100. The output may be a pixel-level mask showing the probability, for each pixel, that eye gaze is on that pixel. Note, this is a top-down approach to determining perceptual saliency, in which knowledge of the action performed (provided by the model 100 in this case) is used to predict where a viewer's eye gaze would be. In other embodiments, other feature representations of the latent region may be used for this prediction (e.g, histograms of oriented gradients or statistics computed over low-level image-based interest operators).

Figure 3:
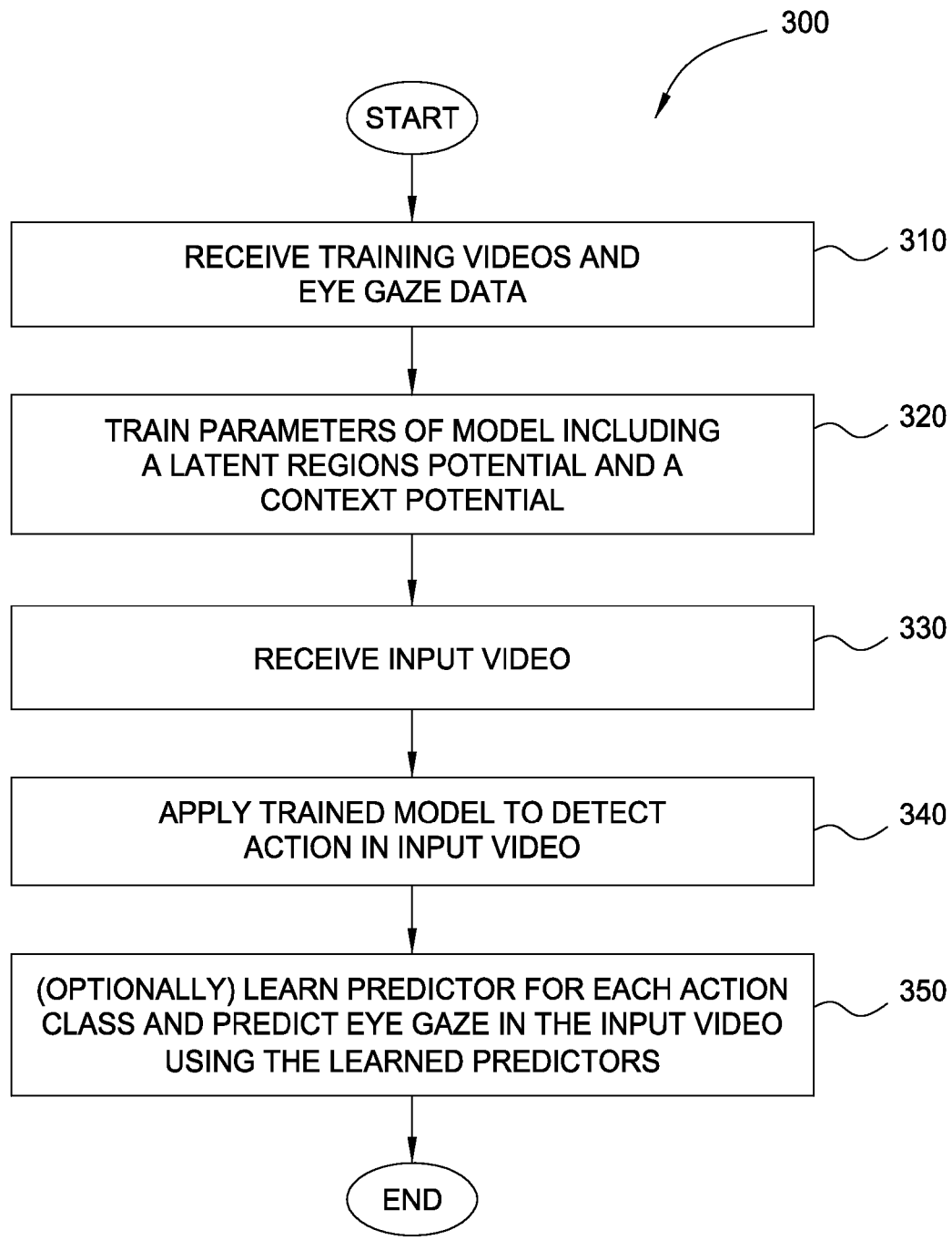
FIG. 3 illustrates a method for recognizing and localizing action in video, according to an embodiment.

FIG. 3 illustrates a method 300 for recognizing and localizing action in video, according to an embodiment. The method 300 begins at step 310, where an action detection application receives training videos and associated eye gaze data. The training videos may include any video sequences depicting human action (e.g., walking, running, riding a horse, etc.). As discussed, eye gaze data may be acquired by, e.g., observing human eye gaze using a commercially available infra-red (IR) camera as the human(s) watch the training videos.

At step 320, the action detection application trains parameters of a model which includes a latent regions potential and a context potential. Given model parameters w, the goal of training in one embodiment may be to be able to infer binary action labels y* (e.g., "kick," "run," etc.) as well as the location of latent regions h* (e.g., bounding boxes) where the action occurs. In one embodiment, the action detection application may train parameters of the model 100 discussed above with respect to FIG. 1. As discussed, the model 100 has a scoring function which includes a latent regions potential term which measures the compatibility of latent spatio-temporal regions with the action model, and a context potential term which encodes a sum of normalized BoW histograms at each video frame excluding regions indicated by latent variables h.

The model 100's scoring function for the case of y=−1 is equal to zero due to the trivial zero vector feature map. However, estimating the optimal value of the scoring function for the case of y=1 involves maximization over the latent variables. The search space over even a single spatio-temporal path (non-smooth) of variable size bounding boxes in a video sequence of width M, height N, and length T is exponential: $O(MN)^{2T}$. In one embodiment, the search space may be restricted with a number of assumptions. In such a case, the search space may be constrained to smooth spatio-temporal paths of fixed size bounding boxes. These constraints allow the inference of the optimal latent variables for a single region using dynamic programming, similar to the Max-Path algorithm. However, other embodiments may not require fixed sized bounding boxes or bounding boxes of rectangular shape.

Given the assumptions for restricting the search space, the action detection application may use the following dynamic programming algorithm (Algorithm 1) for inference, with time and space complexity of O(MNT). Algorithm 1 is a generalization of the Max-Path algorithm, and allows an efficient search over a structured space of multiple spatio-temporal paths. This algorithm assumes that an action can be encoded by a set of latent/unobserved volumes in space-time, designating a smoothly varying "fovial" fixation path, and searches over all possible such volumes to find the ones most indicative of action.

---

Algorithm 1 MaxCPath: Inference of Single Latent Region with Context

---

1: Input: R (t): the context local response without the presence of bounding box,
   $Q_0$ (u, v, t): the context local response excluding the bounding box at location (u, v),
   $Q_1$ (u, v, t): the latent region local response
2: Output: S (t): score of best path till frame t, L (t): end point of the best path till t,
   P (u, v, t): the best path record for tracing back
3: Initialize $S^* = -\inf$, S (u, v, 1) = $Q_0$ (u, v, 1) + $Q_1$ (u, v, 1) + $\Sigma_{i=2}^T$ R (i) , $\forall$u, v, $l^*$ = null
4: for t ← 2 to T do // Forward Process, Backward Process: t ← T to 2
5:     for each (u, v) ∈ [1..M] × [1..N] do
6:         $(u_0, v_0)$ ← $\text{argmax}_{(u',v') \in Nb(u,v)}$ S (u, v, t − 1)
7:         if S $(u_0, v_0, t - 1) > \Sigma_{i=1}^T$ F (i) then
8:             S (u, v, t) ← S $(u_0, v_0, t - 1)$ + $Q_0$ (u, v, t) + $Q_1$ (u, v, t) − R (t)
9:             P (u, v, t) ← $(u_0, v_0, t - 1)$
10:        else
11:            S (u, v, t) ← $Q_0$ (u, v, t) + $Q_1$ (u, v, t) + $\Sigma_{i=2}^T$ R (i) − R (t)
12:        end if
13:        if S (u, v, t) > $S^*$ then
14:            $S^*$ ← S (u, v, t) and $l^*$ ← (u, v, t)
15:        end if
16:    end for
17:    S (t) ← $S^*$ and L (t) ← $l^*$
18: end for

---

Without introducing further constraints on the latent variable, Algorithm 1 cannot be extended to multiple latent regions without producing an exponential, in the number of regions, algorithm, because of the implicit dependency of the latent variables through the context term. In one embodiment, temporal ordering constraints are incorporated between the K latent regions, which leads to a polynomial time algorithm. In such a case, the optimal scoring function may be inferred by enumerating all potential end locations of each latent region and executing Algorithm 1 at each interval in $O(MNT^K)$. For the special case of K=2, the action detection application may use a forward/backward message process that remains linear in the size of the volume: O(MNT), as summarized in Algorithm 2, below. For K>2, a similar, but modified, approach may be used to achieve efficiency but will in general lead to more expensive inference of complexity $O(MNTK^{K-1})$.

---

Algorithm 2 Inference: Two Latent Regions with Context

---

1: Input: R (t): the context local response without the presence of bounding box,
   $Q_0$ (u, v, t): the context local response excluding the bounding box at location (u, v),
   $Q_1$ (u, v, t): the latent region local response of the first region,
   $Q_2$ (u, v, t): the latent region local response of the second region
2: Output: $S^*$: the maximum score of the inference, $h_1$, $h_2$ : first and second latent regions
3: Initialize $S^* = -\inf$, $t^*$ = null
4: $(S_1, L_1, P_1)$ ← MaxCPath − Forward (R, $Q_0$, $Q_1$)
5: $(S_2, L_2, P_2)$ ← MaxCPath − Backward (R, $Q_0$, $Q_2$)
6: for t ← 1 to T − 1 do
7:     S ← $S_1$ (t) + $S_2$ (t + 1) − $\Sigma_{i=1}^T$ R (i)

Algorithm 2 Inference: Two Latent Regions with Context

```
 8:      if S > S* then
 9:          S* ← S and t* ← t
10:      end if
11: end for
12: h₁ ← traceBackward (P₁, L₁ (t*))
13: h₂ ← traceForward (P₂, L₂ (t* + 1))
```

Given the inference algorithms discussed above, the action detection application may train parameters w in the model 100 by minimizing a loss function that quantifies how different the inferred binary label y* is from the correct label y provided in training. In one embodiment, the action detection application may use a loss function that weakly supervises the selection of latent variables based on human gaze information. In such a case, the training set of videos $\{x_1, \ldots, x_n\}$ and associated action labels $\{y_1, \ldots, y_n\}$ may include 2D fixation points sampled at a higher frequency than the frame rate of, e.g., 16 subjects observing the video. The action detection application may transform these measurements using kernel density estimation with Gaussian kernel (with bandwidth set to the visual angle span of, e.g., 2° to account for visual acuity) to a probability density function of gaze $g_i = \{g_i^1, \ldots, g_i^{T_i}\}$ at each frame of video $x_i$. Following the Latent Structural SVM formulation, learning may take the form:

$$\min_{w, \xi \geq 0} \frac{1}{2} \|w\|^2 + c \sum_{i=1}^{n} \xi_i \qquad (3)$$

$$\max_{h_i' \in \mathcal{H}} w^T \Psi(x_i, y_i, h_i') - w^T \Psi(x_i, \hat{y}_i, \hat{h}_i) \geq$$

$$\Delta(y_i, g_i, \hat{y}_i, \hat{h}_i) - \xi_i, \forall \hat{y}_i \in \{-1, 1\}, \forall \hat{h}_i \in \mathcal{H},$$

where $\Delta(y_i, g_i, \hat{y}_i, \hat{h}_i) \geq 0$ is an asymmetric loss function encoding the cost of an incorrect action label prediction but also of mislocalization of the eye gaze. The loss function is defined as follows:

$$\Delta(y_i, g_i, \hat{y}_i, \hat{h}_i) = \begin{cases} 1 - \frac{1}{K} \sum_{k=1}^{K} \delta(g_i, \hat{h}_{ik}) & \text{if } y_i = \hat{y}_i = 1, \\ 1 - \frac{1}{2}(y_i \hat{y}_i + 1) & \text{otherwise} \end{cases} \qquad (4)$$

$\delta(g_i, \hat{h}_{ik})$ indicates the minimum overlap of $\hat{h}_{ik}$ and a given eye gaze $g_i$ map over a frame:

$$\delta(g_i, \hat{h}_{ik}) = \min_j \delta_p(b_{ik}^j, g_i^j), T_{s,k} \leq j \leq T_{e,k}, \qquad (5)$$

$$\delta_p(b_{ik}^j, g_i^j) = \begin{cases} 1 & \text{if } \sum_{b_{ik}^j} g_i^j \geq r, 0 < r < 1, \\ \frac{1}{r} \sum b_{ik}^j g_i^j & \text{otherwise,} \end{cases} \qquad (6)$$

where $b_{ik}^j$ is the bounding box at frame j of the k-th latent region in the $x_i$ video. The parameter r regulates the minimum amount of eye gaze "mass" that should be enclosed by each bounding box. The loss function can be easily incorporated in Algorithm 1, discussed above, during the loss-augmented inference.

At step 330, the detection application receives input video. Once the model 100 is trained, the detection application may take as input a video sequence. Note, eye-gaze data is not required as input.

At step 340, the detection application applies the trained model to detect action in the input video. The detection application may apply the trained model 100 to the input video sequence to infer the action label y* as well as the location of regions h* in each frame of the video sequence where action is detected. Note, eye-gaze data is not required as input during such inference after the model 100 is trained. In one embodiment, the detection application may use the inference algorithms 1 and 2, discussed above, to make predictions of actions and locations of regions where actions occur.

At step 350, the action detection application learns a predictor for each action class and predicts eye gaze in the input video using the learned predictors. This step is optional. The model 100 discussed above is based on the assumption that a subset of perceptually salient regions of a video, encoded by eye gaze data, share discriminative idiosyncrasies useful for action classification. The loss function dictating the learning process, discussed above, enables the parameters of the model 100 to encode this notion into the model 100. Given the trained model, the action detection application may predict eye gaze for latent regions output by the model 100. This may be accomplished by regressing the amount of eye gaze (probability density map over gaze) on a fixed grid, inside each bounding box of the latent regions, by conditioning on low level features that construct the feature map $\psi_i$ and the action label. In this way the latent regions select consistent salient portions of videos using top-down knowledge about the action, and image content modules the saliency prediction within those regions. In one embodiment, the action detection application may, given the training data gaze g and the corresponding inferred latent variables h, learn a linear regression, per action class, that maps augmented feature representation of the extracted bounding boxes, of each latent region, to a coarse description of the corresponding gaze distribution. For example, the action detection application may divide each bounding box into a 4×4 grid, compute a BoW representation for each cell, and construct the augmented feature by concatenating the BoW histograms. Similarly, the gaze may be summarized by a 16 dimension vector by accumulating gaze density at each cell over a 4×4 grid. For visualization, the action detection application may smooth the predictions to obtain a continuous and smooth gaze density over the latent regions, such as that shown in panel B of FIG. 2. In other embodiments finer or coarser predictions and feature representations can be used (e.g., to produce more precise pixel-level predictions). Other embodiments can also utilize other forms of liner or non-liner regression, including but not limited to kernel regression, structured prediction models, SVM regression, and Gaussian Process regression.

Figure 4:
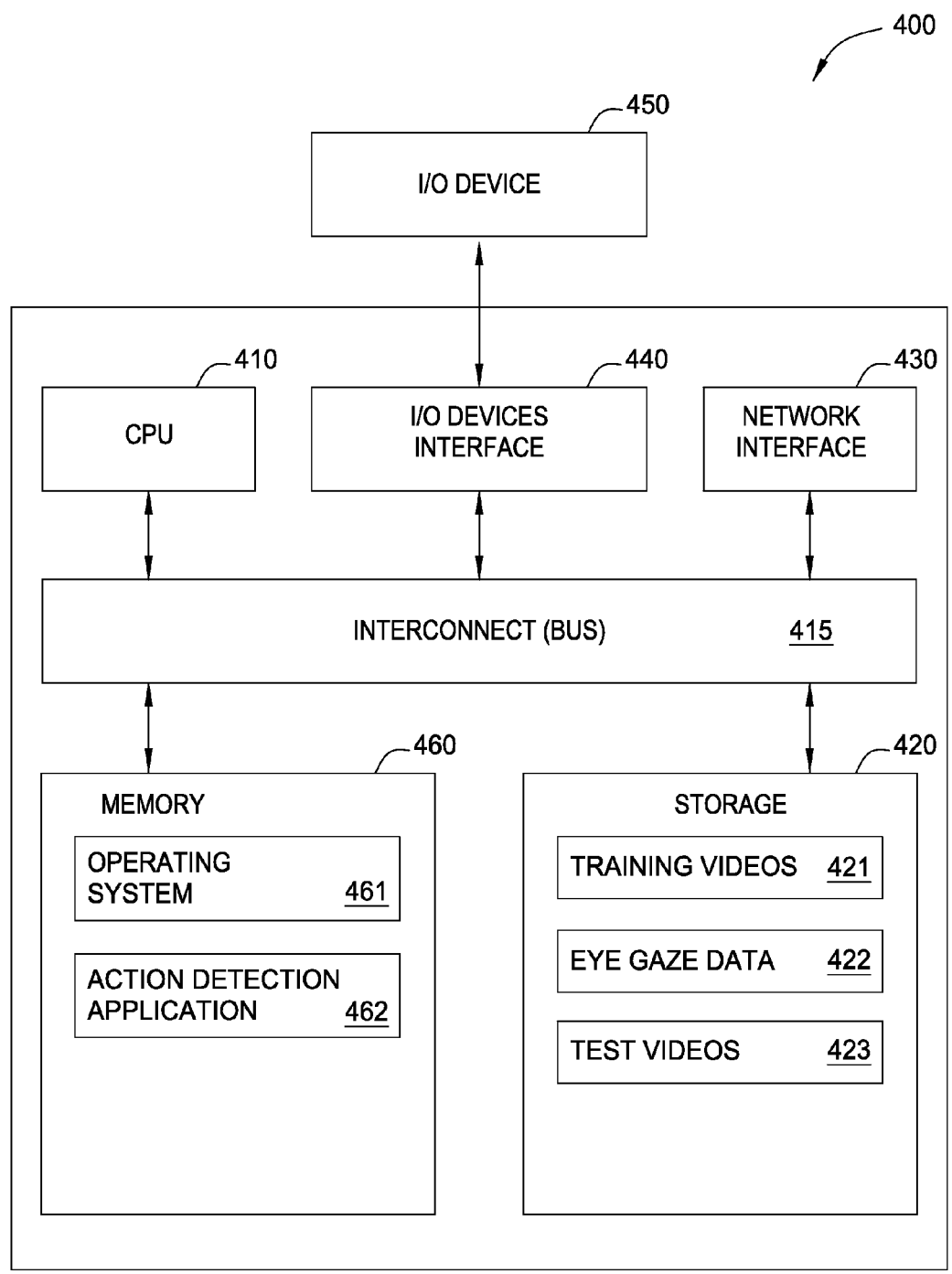
FIG. 4 illustrates a system in which an embodiment may be implemented.

FIG. 4 illustrates a system 400 in which an embodiment may be implemented. As shown, the system 400 includes, without limitation, a central processing unit (CPU) 410, a network interface 430, an interconnect 415, a memory 460, and storage 420. The system 400 may also include an I/O device interface 440 connecting I/O devices 450 (e.g., keyboard, display and mouse devices) to the system 400.

The CPU 410 retrieves and executes programming instructions stored in the memory 460. Similarly, the CPU 410 stores and retrieves application data residing in the memory 460. The interconnect 415 facilitates transmission, such as of programming instructions and application data, between the CPU 410, I/O device interface 440, storage 420, network interface 430, and memory 460. CPU 410 is included to be representative of a single CPU, multiple CPUs, a single CPU having multiple processing cores, and the like. And the memory 460 is generally included to be representative of a random access memory. The storage 420 may be a disk drive storage device. Although shown as a single unit, the storage 420 may be a combination of fixed and/or removable storage devices, such as magnetic disk drives, flash drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of the system 400 shown in FIG. 4 may be distributed across multiple computing systems connected by a data communications network.

As shown, the memory 460 includes an operating system 461 and an action detection application 462. Illustratively, the operating system 461 may include Microsoft's Windows®. The action detection application 462 is configured to receive video sequences, action labels, and eye gaze data, and to learn a model for action detection and localization. In one embodiment, the action detection application 462 may be configured to train parameters of a model which includes a latent regions potential and a context potential, and may train the model parameters by minimizing a loss function that weakly supervises the selection of latent variables based on human gaze information, as discussed with respect to FIG. 3. In such a case, the action detection application 462 may also make inferences based on a dynamic programming algorithm, such as Algorithms 1 and 2 discussed above. In alternative embodiments, the functions of learning the model and applying the model may be split between one or more different applications, as opposed to being performed by the action detection application 462 alone.

Although discussed above primarily with respect to human actions, embodiments disclosed herein may also be applied to detect actions performed by other animate or inanimate objects.

Advantageously, embodiments disclosed herein train a model for motion detection in video using eye-gaze data for weak supervision. Learning using eye-gaze data avoids the need for manual annotations of actor(s) position within video frames, and results in more robust and semantically interpretable models. In some embodiments, the model being trained may account for contextual information, which may improve action recognition. Inference algorithms discussed herein make predictions efficiently for one and two latent regions of action. Further, conditioned on the action label and inferred spatio-temporal path, the model may provide top-down action-specific saliency by predicting the distribution of eye gaze.

The preceding description references aspects of the disclosure. However, it should be understood that the disclosure is not limited to specific described aspects. Instead, any combination of the preceding features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the preceding aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to aspects of the present invention, other and further aspects of the invention may be devised without departing from the basic scope thereof, and the scope thereof is determined by the claims that follow.

What is claimed is:

1. A computer-implemented method for detecting action in a video, comprising:
   receiving training video sequences and eye gaze data associated therewith;
   training an action detection model using the training video sequences and the eye gaze data, wherein the training includes minimizing a loss function which penalizes misclassification of action and further penalizes mislocalization of eye gaze regions during supervised selection of latent variables based on the eye gaze data, wherein the latent variables specify spatio-temporal regions the action detection model selects;
   receiving an input video; and
   detecting occurrences of actions in the input video using the trained action detection model.

2. The computer-implemented method of claim 1, wherein the action detection model includes a latent regions potential which measures compatibility of latent spatio-temporal regions with the action detection model.

3. The computer-implemented method of claim 2, wherein the latent regions potential uses a sum of normalized bag of words (BoW) histograms extracted from one or more bounding boxes defined by the latent variables.

4. The computer-implemented method of claim 2, wherein the action detection model further includes a context potential which accounts for contextual information not directly produced by appearance and motion of actors.

5. The computer-implemented method of claim 4, wherein the context potential encodes a sum of normalized BoW histograms at each frame excluding one or more bounding boxes defined by the latent variables.

6. The computer-implemented method of claim 2, wherein the action detection model further includes a global BoW in which a given video is represented with a histogram across the entirety of the given video and spatio-temporal structure is discarded.

7. The computer-implemented method of claim 1, wherein the training of the action detection model includes learning parameters of the action detection model using a latent structured support vector machine.

8. The computer-implemented method of claim 1, further comprising:
   learning a predictor for each action class using the eye gaze data and corresponding inferred latent regions, wherein the predictor maps a feature representation of the bounding box of each latent region to a description of corresponding eye gaze distribution; and
   predicting eye gaze in the input video using the predictor.

9. The computer-implemented method of claim 8, wherein the predictor is a linear regression model.

10. The computer-implemented method of claim 1, wherein, in the training the action detection model and the detecting occurrences of actions, inference of actions and locations thereof is performed using a dynamic programming algorithm.

11. The computer-implemented method of claim 10, wherein the dynamic programming algorithm is configured to infer one or two latent regions.

12. The computer-implemented method of claim 11, wherein the dynamic programming algorithm configured to infer two latent regions includes a forward/backward message process.

13. A non-transitory computer-readable storage medium storing a program, which, when executed by a processor performs operations for detecting action in a video, the operations comprising:
   receiving training video sequences and eye gaze data associated therewith;
   training an action detection model using the training video sequences and the eye gaze data, wherein the training includes minimizing a loss function which penalizes misclassification of action and further penalizes mislocalization of eye gaze regions during supervised selection of latent variables based on the eye gaze data, wherein the latent variables specify spatio-temporal regions the action detection model selects;
   receiving an input video; and
   detecting occurrences of actions in the input video using the trained action detection model.

14. The computer-readable storage medium of claim 13, wherein the action detection model includes a latent regions potential which measures compatibility of latent spatio-temporal regions with the action detection model.

15. The computer-readable storage medium of claim 14, wherein the latent regions potential uses a sum of normalized bag of words (BoW) histograms extracted from one or more bounding boxes defined by the latent variables.

16. The computer-readable storage medium of claim 14, wherein the action detection model further includes a context potential which accounts for contextual information not directly produced by appearance and motion of actors.

17. The computer-readable storage medium of claim 16, wherein the context potential encodes a sum of normalized BoW histograms at each frame excluding one or more bounding boxes defined by the latent variables.

18. The computer-readable storage medium of claim 14, wherein the action detection model further includes a global BoW in which a given video is represented with a histogram across the entirety of the given video and spatio-temporal structure is discarded.

19. The computer-readable storage medium of claim 13, wherein the training of the action detection model includes learning parameters of the action detection model using a latent structured support vector machine.

20. The computer-readable storage medium of claim 13, the operations further comprising:
   learning a predictor for each action class using the eye gaze data and corresponding inferred latent regions, wherein the predictor maps a feature representation of the bounding box of each latent region to a description of corresponding eye gaze distribution; and
   predicting eye gaze in the input video using the predictor.

21. The computer-readable storage medium of claim 20, wherein the predictor is a linear regression model.

22. The computer-readable storage medium of claim 13, wherein, in the training the action detection model and the detecting occurrences of actions, inference of actions and locations thereof is performed using a dynamic programming algorithm.

23. A system, comprising:

a processor; and a memory, wherein the memory includes an application program configured to perform operations for detecting action in a video, the operations comprising:

receiving training video sequences and eye gaze data associated therewith, training an action detection model using the training video sequences and the eye gaze data, wherein the training includes minimizing a loss function which penalizes misclassification of action and further penalizes mislocalization of eye gaze regions during supervised selection of latent variables based on the eye gaze data, wherein the latent variables specify spatio-temporal regions the action detection model selects, receiving an input video, and detecting occurrences of actions in the input video using the trained action detection model.

\* \* \* \* \*

UNITED STATES PATENT AND TRADEMARK OFFICE
CERTIFICATE OF CORRECTION

PATENT NO. : 9,514,363 B2  
APPLICATION NO. : 14/247845  
DATED : December 6, 2016  
INVENTOR(S) : Sigal et al.

Page 1 of 1

It is certified that error appears in the above-identified patent and that said Letters Patent is hereby corrected as shown below:

In the Specification

Column 3, Line 59, delete "$(l^j, t^j, r^j, b^j)_{j=Ts}^{Te}$," and insert -- $(l^j, t^j, r^j, b^j)_{j=Ts}^{Te}$ --, therefor.

Column 7, Line 39, delete "$\Delta(y_i, g_i, \hat{y}_i \hat{h}_i) \geq 0$" and insert -- $\Delta(y_i, g_i, \hat{y}_i, \hat{h}_i) \geq 0$ --, therefor.

Signed and Sealed this  
Seventh Day of March, 2017

Michelle K. Lee  
*Director of the United States Patent and Trademark Office*